United States Patent
Mackey et al.

(10) Patent No.: US 6,691,259 B1
(45) Date of Patent: Feb. 10, 2004

(54) TERMINAL SERVER DATA FILE EXTRACTION AND ANALYSIS APPLICATION

(75) Inventors: Kyle Joseph James Mackey, Aliso Viejo, CA (US); Matthew James Hengst, Lake Forest, CA (US); Mark Douglas Whitener, Aliso Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 550 days.

(21) Appl. No.: 09/664,101

(22) Filed: Sep. 19, 2000

(51) Int. Cl.[7] .................................................. G06F 11/00
(52) U.S. Cl. ........................................... 714/46; 714/20
(58) Field of Search .............................. 714/46, 47, 48, 714/39, 18, 45, 27, 31, 37, 20

(56) References Cited

U.S. PATENT DOCUMENTS

| | | | |
|---|---|---|---|
| 5,742,819 A | * | 4/1998 | Caccavale .................. 707/200 |
| 5,761,486 A | * | 6/1998 | Watanabe et al. ............. 703/21 |
| 5,892,937 A | * | 4/1999 | Caccavale .................. 711/135 |
| 5,919,248 A | * | 7/1999 | Kahkoska et al. .......... 709/224 |
| 6,067,639 A | * | 5/2000 | Rodrigues et al. ............ 714/38 |
| 6,182,249 B1 | * | 1/2001 | Wookey et al. ............... 714/47 |
| 6,282,173 B1 | * | 8/2001 | Isonuma et al. ............. 370/242 |
| 6,408,403 B1 | * | 6/2002 | Rodrigues et al. ............ 714/38 |
| 6,467,052 B1 | * | 10/2002 | Kaler et al. .................... 714/39 |

* cited by examiner

Primary Examiner—Nadeem Iqbal
(74) Attorney, Agent, or Firm—Alfred W. Kozak; Mark T. Starr; Lise A. Rode (57) ABSTRACT

Parametric data accumulation means are accumulated in a Terminal Server data file which uses a performance measurement tool program to accumulate operational data occurring in multiple client users which operate on a Terminal Server. Data is accumulated in regard to the log-on time for multiple and various different types of application programs. Each of these parameters are evaluated over a sequence of different operating conditions during periods where the parametric evaluations occur when there is a small number of client users and then over a sequence of expanded operations until there is a large number of concurrent active client users. Subsequently, the Terminal Server data file is formatted and categorized into a database which is used to create a graphical chart of performance plus specific lists of performance for each client-user correlated to each available Application Program.

9 Claims, 3 Drawing Sheets

TERMINAL SERVER DATA FILE EXTRACTION AND ANALYSIS APPLICATION

CROSS-REFERENCES TO RELATED APPLICATIONS

This application is related to another co-pending application, U.S. Ser. No. 09/664,100 entitled "TERMINAL SERVER SIMULATED CLIENT PERFORMANCE MEASUREMENT TOOL", now U.S. Pat. No. 6,567,767, which is incorporated herein by reference.

FIELD OF THE INVENTION

This application involves methods for organization and analysis of hundreds of similarly formatted Terminal Server data files which have been recorded from the results of the Terminal Server's performance test operations.

BACKGROUND OF THE INVENTION

In the situation involving networks where numerous client terminals are connected to a server, it is desirable to obtain information as to the actual execution times for accessing programs, and also for example, accessing information about the time required for executing different parts of available programs.

Thus, a performance and measurement system for defining and measuring user-relevant response times to remote client stations which are serviced by a terminal server, is of great importance to evaluate the status of a network of users and terminal servers.

Performance data produced by the interaction of the client-users and the terminal server is collected and subsequently logged. Once the data is logged, the data may then be accessed and collected by an administrator in order to evaluate the system responses involved in the network.

Performance tools are used to measure the performance of the server in regard to its availability of servicing the various and multiple clients. A resultant state of the system may be accomplished in order to evaluate the total resource utilization of the system. Such a determination may eventually discover which resources cause slowdowns or bottlenecks in system performance, and once identified these resources can be upgraded to improve system performance.

Another useful purpose for evaluating computer performance may be for what is called "application tuning" in order to focus on particular user applications or situations in order to determine how to improve system performance regarding a particular application.

Another use for performance tools is for the purpose of troubleshooting and to help determine why system performance may be degrading without any immediately apparent reason.

In many situations, so-called performance tools have generated too much information making it difficult for an operator-user to fully comprehend the nature of what is happening. If a system gathers and logs huge amounts of information, this requires large memory sources for data logging and is often very difficult to analyze, in addition to taking a lot of processing power to generate this information and then to try to present this data into a form that is useful to a user.

It is always a problem to identify when the performance of a system has been degraded beyond acceptable limitations. Many of the earlier attempts for such analysis provided only indirect information regarding the end-user's performance expectations in addition to requiring extraordinary administration and management efforts in the system to develop the required information. Many of the earlier systems were likely to be influenced by the test environment characteristics and did not provide feedback for the actual client sessions under test. As a result, this necessitated the opening of additional terminal server connections which were time-consuming and costly and caused significant additional CPU overhead.

As was previously described in the co-pending U.S. Ser. No. 09/664,100 entitled "TERMINAL SERVER SIMULATED CLIENT PERFORMANCE MEASURING TOOL", now U.S. Pat. No. 6,567,767, a system and method was provided to measure and collect the response times for the variety of designated actions initiated by terminal server scripts. The method operated to call a timer utility before and after each designated action, such as—logging on, opening applications, and typing, after which the data was logged into a Timer Log File.

The presently described application then tackles the problem of accessing hundreds of formatted Terminal Server data files in order to organize and graph the information for suitable analysis.

SUMMARY OF THE INVENTION

A program is provided to measure, collect, and analyze response times for a variety of actions initiated by terminal server scripts in a system where multiple client users are connected via hubs and switches to a back-end server. The calling of a timer utility before and after each set of designated actions provides information on resulting response times. These response times are collected and imported into a database where the data is organized for analysis and comparison.

The performance data is logged into a timer log file which is then subjected to the data file extraction and analysis process where the log files are queried, sorted, then calculations are made and placed into desired formats so that the resulting information can be analyzed.

BRIEF DESCRIPTION OF THE DRAWINGS

The patent or application file contains at least one drawing executed in color. Copies of this patent or patent application, publication with color drawings will be provided by the Office upon request and payment of the necessary fee.

Appendix I is a database created from 161 Terminal Server data files each representing a simulated client.

Appendix II is a Terminal Server data file showing the response times for measured simulated client actions. Each line represents a unique measured action, which is identified by the specific user who performed the action followed by the action label, the response time in milliseconds, and finally the time and date the action completed.

GLOSSARY OF RELEVANT TERMS

ACTION LABEL: An Action label is a descriptive name that an administrator assigns to an action that he/she has decided to measure using the Terminal Server Simulated Client Performance Measurement Tool. On Table II of this disclosure, there are six Action labels for discreet actions that were designated within the TS Scripts for measurement. These action labels are: Connect, Excel, Outlook, Cmd Prompt, IExplorer, and Word. These are also called "Performance Categories".

BACK END SERVERS: Servers that form the infrastructure for the test environment. Various applications and user functionality is supported by these servers with the intent of modeling a real world environment (IIS, PDC, Monitor, Control, Exchange).

CLIENT SCRIPT: A looping list keyboard input that is fed from the TS (Terminal Server) Client to the Test Server in order to mimic real user input. The script sends the appropriate keyboard sequence to log into a Windows session, open Excel, Outlook, Internet Explorer, Word, and perform common real world actions within each application (i.e., creating graphs, printing, sending email, browsing web pages). StartTimer and StopTimer calls before and after designated activities are inserted into these scripts.

CONTROL: Control station (CONTROL) controls the creation, distribution, and execution of the scripts. It also manages the remote Client PC's as they execute the scripts, and timer functions.

EXCHANGE: A server that hosts and allows email services.

IIS: Internet Information Server. Hosts the internet sites that are browsed in the course of the Client Script loop.

GRAPHICAL UPDATE: When a user delivers some form of input (as, for example, pressing the letter "k" on the keyboard) to a Terminal Server Client Session, the "k" input is first sent to the Terminal Server over the network. The Terminal Server decided what should happen when this "k" is input. If this "k" input changes what should be displayed on the screen of the Terminal Server Client Session, then the Terminal Server sends that graphical update over the network to the Client Session. If a text editor such as Microsoft Word was open when the "k" was submitted, then the corresponding graphical update would add the letter "k" to the appropriate location on the Terminal Server Client window.

LOG FILE: Synonymous with Timer Log File, and Terminal Server Data File.

MONITOR: The monitor station (MONITOR) captures all the Performance Monitor data from the test server, and stores the associated logs. This monitoring is done remotely in order to minimize the performance impact on the server under test.

PDC: (Primary Domain Controller). This is the system that authenticates user logons for the entire testing domain including the TS Clients who attempt to gain access to the test server.

REMOTE CLIENT PC: A variety of desktop PC's can be used as a remote Client PC. This remote system runs the terminal server client (TS Client). These systems host the client component of the TS connection, the SM Client, and the log files.

SM CLIENT: The application which takes a client script and feeds it to the TS (Terminal Server) Client. This process occurs strictly on the remote client PC and therefore does not contribute to the load/stress on the test server.

SQL QUERY: Query in Excel macro that allows access to multiple client Timer Log Files.

TERMINAL SERVER DATA FILE: A file created during the execution of a timer modified Client script. This file details the results from the timing actions.

TERMINAL SERVER EDITION: A Terminal Server Client (TS Client) is an application that runs on a remote client PC. It receives desktop graphics from the test server and sends user initiated mouse movements and keyboard strokes to the test server.

TERMINAL SERVICES: Although the process is virtually transparent to the user, terminal services gives remote users the capability to run the Windows desktop and applications from a central server. A small application, the Terminal Server Client (TS Client), is installed on the Remote Client PC. The Terminal Server Client sends mouse movements and keystrokes and receives the corresponding graphical updates from the central server.

TEST SERVER: This server is the focus of the testing environment. It runs the Terminal Services enabling operating system (NT4 Server Terminal Server Edition, or Windows 2000 Server with Terminal Services component enabled). The test server receives mouse movements and keyboard input over the network sent from the TS (Terminal Server) Clients which are executing on the remote Client PC. The server hosts the client desktops and applications, sending the resulting graphical updates to the TS Client. The test server is commonly referred to as a central server because it "centralizes" the execution of Windows desktops and applications similar to the way a mainframe works.

TIMER: Clock time in milliseconds with a resolution equal to the machine cycle speed.

TIMER DYNAMIC LIBRARY: A dynamic linked library piece of the WTS Timer Utility containing multiple programmatic procedures that can be called/initiated from another file. The Client Scripts are modified with calls to this library.

TIMER LIBRARY: Synonymous with Timer Dynamic Library.

TIMER LOG FILE: Synonymous with Terminal Server data file and Terminal Server Data File.

USER ID: Each TS (Terminal Server) Client has a unique identifier.

WTS TIMER UTILITY: Suite of tools used to profile and report results of Windows Terminal Server runs.

DESCRIPTION OF PREFERRED EMBODIMENT

Figure 1:
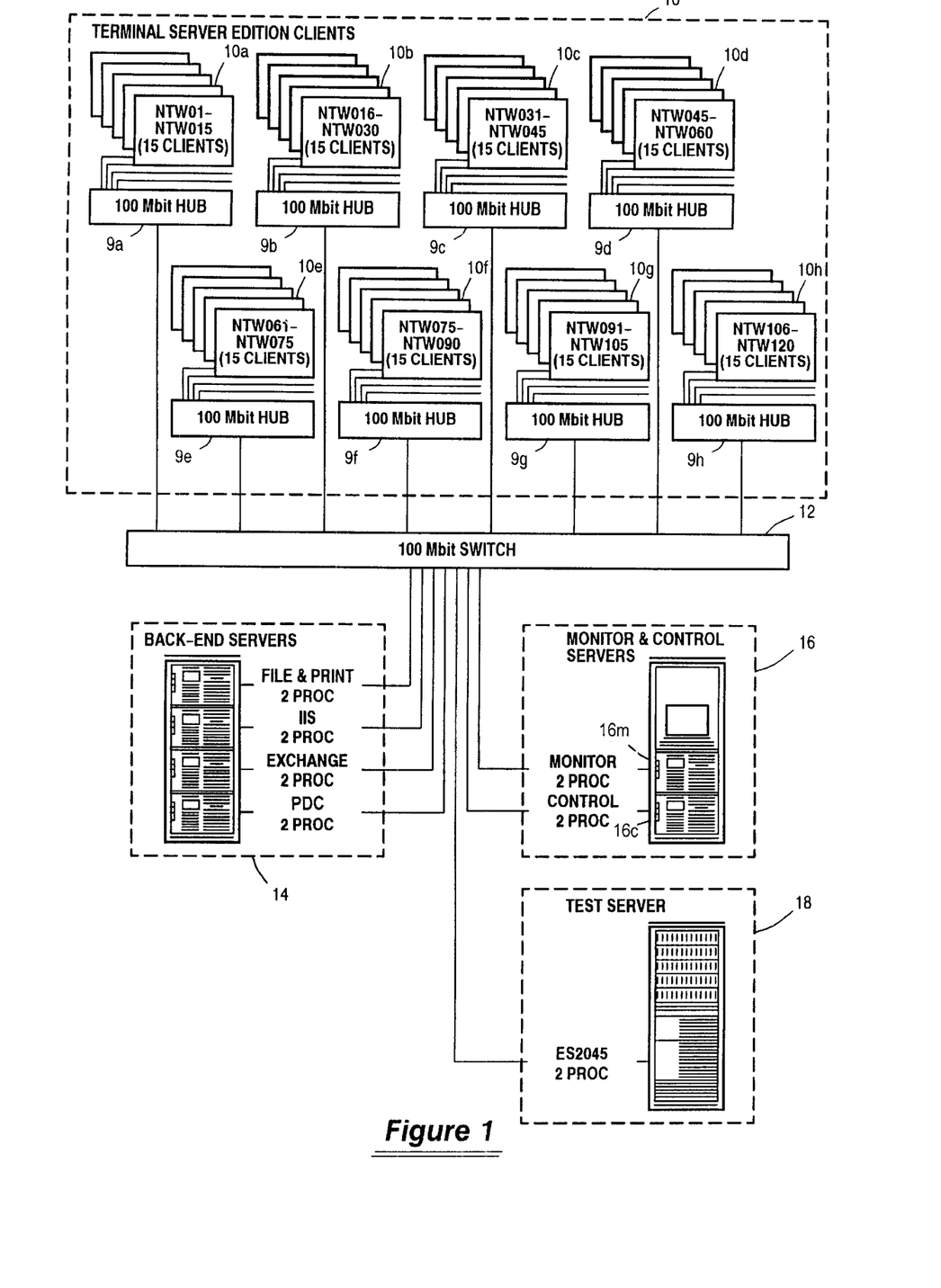
FIG. 1 is a drawing of a system network showing multiple clients connected through a switching device to a back-end server, and to monitor and control servers and also a test server.

FIG. 1 shows the general overall environment of modules and units which are involved in the computing architecture for a Thin-Client/Server set of installations. The test server 18 contains a terminal server enabled operating system (NT 4 Terminal Server Edition or Windows 2000 Server with Terminal Services enabled). Terminal Services functionality is made possible using three components which are (i) the Terminal Server Operating System, (ii) the Remote Desktop Protocol, and (iii) Terminal Server Client. With the addition of the SM Client and test script components imaginary users can be created to simulate the work load of real users.

As seen in FIG. 1, there is indicated a PC bank designated as Terminal Server Edition Clients 10. Here there is indicated eight groups of PC's designated 10a, 10b ... thru 10g, 10h. Each item represents a group of 15. Each group of PCs are connected through a 100 megabit HUB designed as 9a, 9b, ... 9g, 9h. Also the series of HUBs are connected to a 100 megabit switch 12.

The Terminal Server client software runs on a range of devices with varying operating systems and enables the users to gain seamless access to 32-bit applications. The Remote Desktop Protocol (RDP) is used to communicate between the client PCs 10 and the test server 18. This component involves a network protocol that connects the client PCs and the test server over the network.

As will be seen in FIG. 1, the testing environment is equipped with 8 sets of 15 PCs 10a, 10b, . . . 10g, 10h. With, for example, 120 total PCs, each running one set of Terminal Server client connections, the testing environment can simulate 120 user connections to the test server 18. While each PC (in the Client Group 10) is capable of running multiple Terminal Server connections.

It is important to know the performance and load capabilities for the Terminal Services Operating System, which is installed on test servers, shown as item 18 in FIG. 1. Here this is of considerable value in order to enable designers to plan and size the deployment of Thin-Client/Server Solutions.

The test server 18 of FIG. 1 is designed to deliver reliable performance and scalability to as many Terminal Server Clients 10 as possible without sacrificing optimal performance. A concept of "optimal performance" is defined as a performance that allows the Thin-Client architecture to remain transparent to the user.

In FIG. 1 the Test Server 18 is set up as a test server for running either the Microsoft Windows NT Server 4.0 Terminal Server Edition or Windows 2000 Server with Terminal Services enabled, and is configured with the Office 2000 Suite of applications. The test network of FIG. 1 also provides a monitor (16 m) and control (16c) of station 16. The monitor station (16 m) captures all the performance monitor data concerning the test server (18) and stores the associated logs. This monitoring is done remotely in order to minimize the performance impact on the server 18 under test.

The control station 16c in module 16 controls the creation, distribution, and execution of the scripts. It also manages the remote clients 10 as they execute the scripts. The Monitor-Control servers 16 and Test Server 18 are seen connected to the 100 megabit switch 12.

Now, additionally connected to the 100 megabit switch 12 is a set of Backend Servers 14 which are set up to simulate a real-world environment. These include a Primary Domain Controller (PDC), a Microsoft Exchange Server 5.5 (EXCHANGE), a Microsoft Internet Information Server 4.0 (IIS), and a Microsoft Windows NT server 4.0, used for file and printer sharing (FILE&PRINT).

BENCHMARK PROCEDURES:

Experimental operations indicated that "simulated" Office 2000 user scripts would take approximately thirty minutes to loop through Outlook, Word, Access, Excel, and Internet Explorer 5 at a typing speed of forty-eight words per minute. These scripts are designed to match the typical work patterns of real-world users. Tests were made to stress the server under test 18 by logging on simulated Terminal Server clients that were running on these scripts.

The number of concurrent clients was gradually increased while the scripts were cycled through the various applications. Thus multiple test runs were conducted and additional sets of Timer data log files were produced using the Terminal Server Client Performance Measurement Tool.

BENCHMARK MEASUREMENTS:

Using the Microsoft Performance Monitor, performance counters were collected on all the available objects and counters. The counters for Processor Usage, Active Sessions, and Processor Queue Length are activated and a recording is made for percent of total processor usage for each period related to the number of active session Client-Users. The performance data thus reflects the stress on the server 18 under test which influences the end-user performance.

To directly evaluate end-user performance, timer components are inserted into the test scripts before and after a designated action. For example, timed actions can include (i) log-on time "Connect"; (ii) time to open applications and (iii) character delay while typing.

Table I below is a table showing one possible configuration for a test server undergoing tests. (this is just one possible server configuration) (Test Server 18).

TABLE I

Server Test Configuration

| System Col. 1 | Processor Col. 2 | Cache Col. 3 | Memory Col. 4 | Disk Col. 5 | Network Col. 6 |
| --- | --- | --- | --- | --- | --- |
| ES2045 | Four Intel Xeon processors at 550 Mhz | L2 Cache: 2 MB per processor | 2 GB Memory | External disk array | One Network Interface Card with 100 MB access |

The first column shows the system designation while the second column shows the processors involved as four Intel XEON processors. Column 3 indicates the cache as a L2 Cache, having two megabytes per processor. Column 4 shows the memory utilized as being 2 gigabytes of memory. Column 5 shows the disk as being an external disk array, while column 6 shows the network as involving one network interface card with one hundred megabytes of access.

DEFINING OPTIMAL PERFORMANCE:

Optimal performance is the point at which a server is loaded with the maximum number of clients possible without user performance degrading beyond a predetermined limitation. During testing, timer logs are created to measure the delays for completing certain actions from the user's point of view. Ideally, the limitations on delays are determined with the intent of providing a transparent solution to the user, that is to say so that the user could not distinguish that the applications are running on a centralized server, such as server 18.

In order to determine the optimal performance of a terminal server solution, it is required that Test Server 18 be placed under a significant load using Thin-Client simulation. Microsoft provides a scripting engine and language to be used for such testing (the SM Client and associated Testing Scripts). So, in order to "simulate" user operations, there are virtual Thin-Clients which are launched and there are user applications applied within the given session. Then realistic user scenarios are constructed by combining both application and task sequences in the scripts.

The Office 2000 user simulation script was developed for measuring the performance of Office 2000 in a Terminal Server environment. By modifying the scripts to time record the desired actions, the Terminal Server Client Measurement Tool measures and saves data regarding the delays involved in executing these actions.

The method for performance test monitoring, using the test server 18, was described in detail in the co-pending application, U.S. Ser. No. 09/664,100 entitled "TERMINAL SERVER SIMULATED CLIENT PERFORMANCE MEASUREMENT TOOL", now U.S. Pat. No. 6,567,767, where performance data was accumulated on a Timer Log File.

Thus there was illustrated the process of measuring response times for a variety of actions on a simulated client. This process is designed to occur for each simulated client that connects to a Terminal Server using a test script modified with the Timer component functions.

Table II is an example of multiple Time Results for a Thin-Client utilization of certain listed programs against the number of clients involved in the network. Thus the "Connect" column indicates the average of various log-on times of 23.01 seconds. The "Excel" column shows an average of 8.57 seconds to open up the Excel program. The "Outlook" column shows 7.22 seconds to access the Microsoft "Outlook" program. These time periods relate to a setup with 134 clients. When 146 clients are on-line, these time figures are different as seen in the row identified as Test 2.

TABLE II

TERMINAL SERVER DATA RESULTS OVERVIEW

| Name | # Clients | Connect | Excel | Outlook | Cmd | IE | Word |
|---|---|---|---|---|---|---|---|
| Test1 | 134 | 23.01 | 8.57 | 7.22 | 29.55 | 8.26 | 7.75 |
| Test2 | 146 | 26.14 | 9.42 | 7.31 | 28.95 | 9.33 | 7.18 |
| Test3 | 162 | 24.60 | 12.42 | 7.91 | 28.86 | 6.93 | 5.80 |
| Test4 | 162 | 23.79 | 8.98 | 8.56 | 29.17 | 8.26 | 6.51 |
| Test5 | 151 | 28.69 | 10.17 | 7.50 | 28.77 | 9.42 | 6.87 |
| Test6 | 157 | 21.00 | 6.49 | 5.21 | 28.15 | 4.97 | 4.43 |
| Test7 | 143 | 33.52 | 15.89 | 10.34 | 28.76 | 9.32 | 7.87 |
| Test8 | 162 | 23.09 | 10.67 | 5.33 | 28.12 | 5.46 | 4.03 |

Note: Access time values for each cited program are shown in milliseconds.

Figure 2:
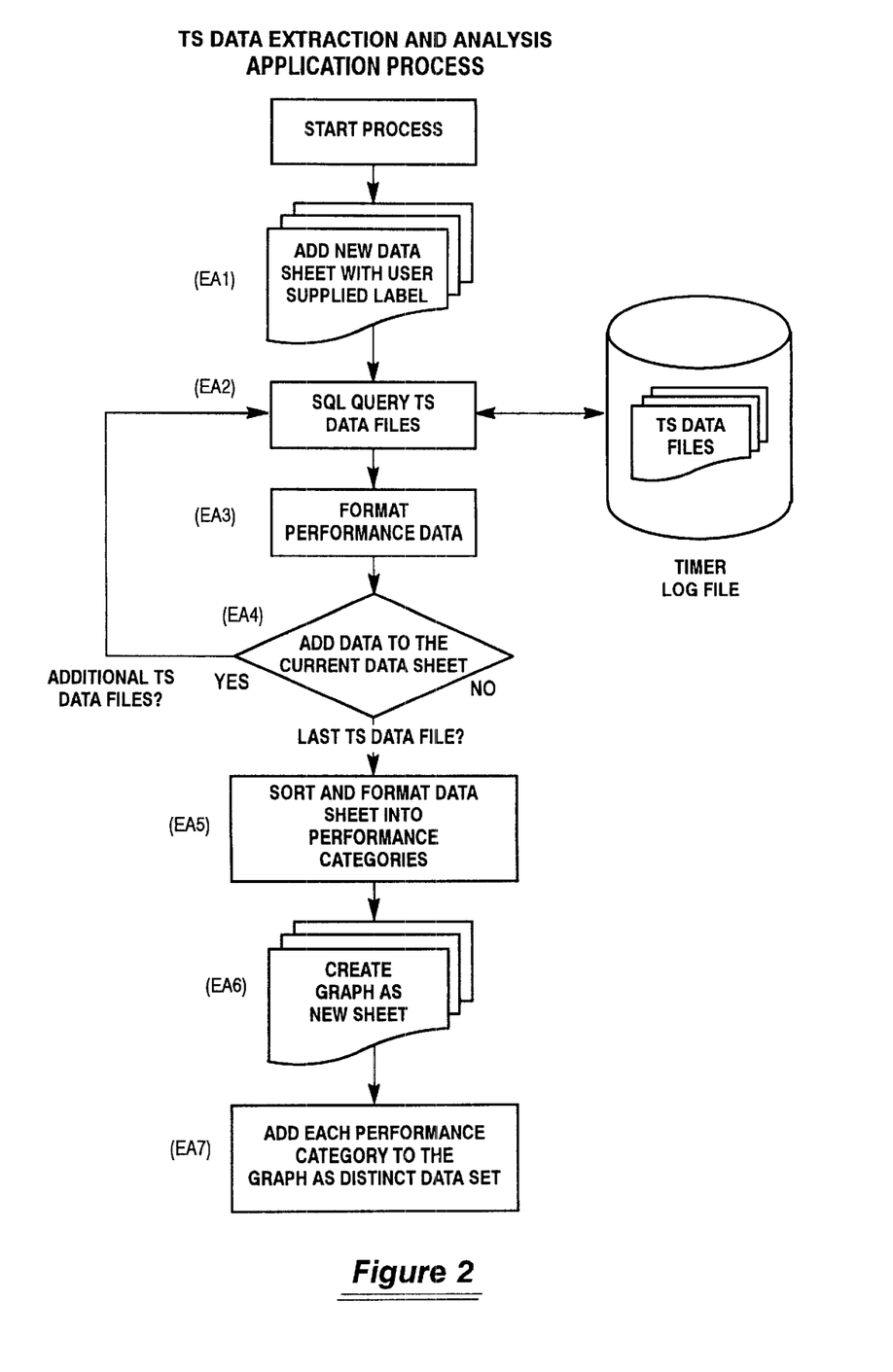
FIG. 2 is a flow chart illustrating how the Terminal Server data files are connected to operate with the Data Extraction and Analysis process in order to access, catalog, sort and format the results so that the data will then be capable of analysis.

Now referring to FIG. 2, there is indicated a flow chart of a specialized terminal server data extraction and analysis application. Referring to FIG. 2, the process is initiated and at step EA1, there is a textbox opened for prompting the user to input a label as a description of the new data sheet. A Data Sheet is a blank page within an Excel workbook. The Excel workbook is a collection of related sheets. Graph sheets are just a special kind of data sheet. At step EA2, a connection is made with a timer log file, also designated as the Terminal Server data files, whereby there is initiated the Sequential Query Language (SQL) to the Terminal Server data files.

Here, the performance data is extracted step-by-step as various elements are entered into the database, and, in addition, this information is also illustrated as a set of averages in Table II, so that the performance data is formatted and made available to a user for observation and analysis.

The Terminal Server Data File (Timer Log file) presents four pieces of information as one line. "Format Performance Data" (step EA3) separates each of these four pieces, of information into individual cells within the same line of the Data Sheet. For example, "user0005, Outlook, 0921, 2000/09/08 15:25:15" becomes four unique characteristics of one timed action: "user005", "Outlook", "0921" and "2000/09/08 15:25:15".

Figure 3:
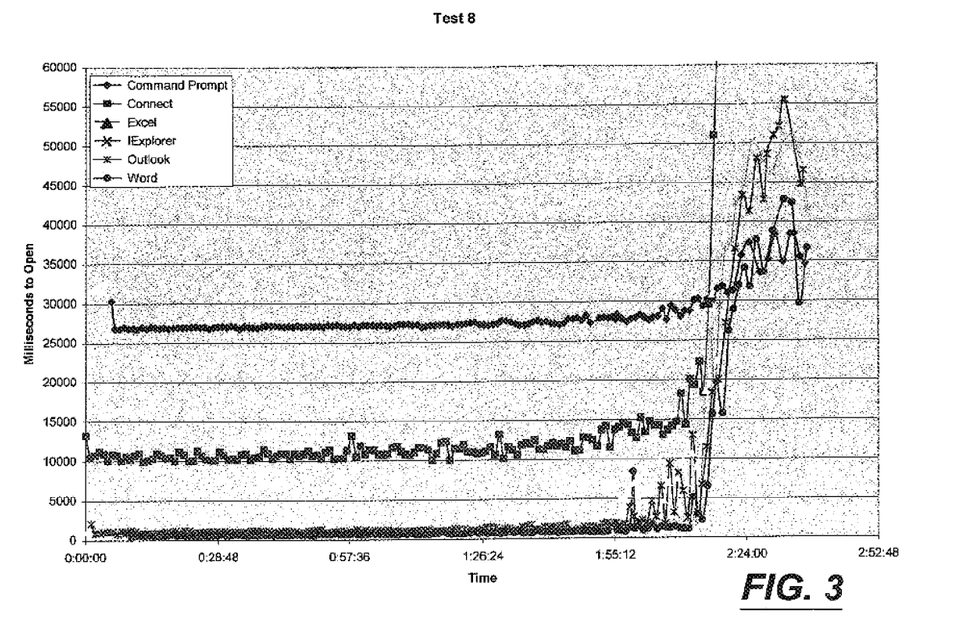
FIG. 3 is a graph plotted from the database file which has been formatted and categorized to provide categorical breakdowns to aid the creation of graphical data.

At step EA4, a query is initiated as to whether there are any additional terminal server data files in which case (YES), the added data is added to the current data sheet. When the last Terminal Server data file is recognized (NO), then at step EA5, there is a sorting and a formatting of the data sheet into various performance categories designated by the labels extracted from the Terminal Server data files. "Sort and Format Data Sheet into Performance Categories" (EA5), organizes the timed actions such that all measured categories (Command Prompt, Connect, Excel IExplorer, Outlook, and Word) are arranged together and in order of occurrence Also, the date and time stamp "2000/09/08 15:25:15" is converted to a relative time since the beginning of the test, such that the first timed action occurs at 0:00:00 and an action occurring 15 seconds after that would be 0:00:15. Then at step EA6, the program will create a graphical display as a new sheet for observation by the observer. FIG. 3 is an example of such a graphical display. The vertical axis depicts the time elapsed between the start of the action and the end of the action, or the response time. The horizontal axis describes the time into the test at which this action occurred.

Then at step EA7, the system will add each new performance category to the graph as a distinct data set.

In FIG. 3 there are shown six performance categories: Command Prompt, Connect, Excel, IExplorer, Outlook, and Word. As more client-users are added (time units on Y axis), it is seen that there comes a time when the access period is too long to allow the system to properly operate.

FIG. 3 on the Y axis represent clients logging on (Connect=Logon). Once logged-on, the clients cycle through their scripts. For example, the square box □ for Connect represents a client logging-on. The 10th box would present 10 "concurrently" operating client-users. At about 150 concurrent users, it is seen how there is a rapid rise in logon time indicating substantial degradation of operations.

The information provided in this chart of FIG. 3 is the final product of the Data File Extraction and Analysis Application. It provides a system architect with sufficient information to make decisions regarding how many users can be supported by a terminal server, when to prohibit additional logons, and when to purchase additional terminal servers. As user sessions are added to the concurrent load the "milliseconds to Open" (response time) increases. The system architect/administrator would devise an acceptable performance guideline regarding response time that would help make this decision. For instance, the architect might desire to keep the response time for opening Excel under 5 seconds. From the chart, it is apparent that the Excel Response time exceeds 5000 milliseconds just beyond the "1:55:12" mark. The administrator can then reference the number of concurrent clients connected to the Terminal Server at this point and time.

Attached as Appendix I and Appendix II is the output analysis data indicating four columns which can be designated from left-to-right as columns 1, 2, 3 and 4. Column 1 shows the ID of the client-user. Column 2 indicates the Action label designated for the Application Program which is sought to be accessed by the particular client-user. Column 3 is a report in milliseconds of the time period that was required for the cited client-user to acquire access to the stated Application Program. Column 4 is a time-report which indicates the point-in-time sequence that the logon report was generated for each client-user and the specific application involved.

Appendix II shows two examples of Terminal Server Data Files. Each data file contains a single line entry for each timed action that the given user executed in the context of a test script executing on a Terminal Server (the process creating this data file is seen in the co-pending U.S Ser. No. 09/664,100 entitled "Terminal Server Simulated Client Performance Measurement Tool"), now U.S. Pat. No. 6,567,767. Here, a user ID is correlated to the action label, response time in milliseconds, then the date and-test cycle point in time.

Appendix I combines the various Terminal Server data files into one comprehensive database. In doing so, each line entry from the data file becomes four distinct column, entries across one row in the database. As this data is now presented in the format of a comprehensive database, it is now subject to sorting and organizing the data to aid in the production of illustrative charts and graphs such as the graph seen in FIG. 3 and the Table seen in Table II.

Described herein has been a method and system for accessing and analyzing Terminal Server performance data contained in a multitude of Terminal Server (TS) data files (Timer Log Files). The data in the TS database is a result of test operations accumulated by an associated performance tool measurement program which tested and recorded certain parameters which client-users were accessing a variety of Application Programs. The recorded parameters in the TS database are accessed, formatted and then categorized so that an analyst may then observe graphical window output and parameter lists which indicate response times for each client-user correlated to each available Application Program. Further, it is possible to see the efficiency of program access during periods of a small number of concurrent users as contrasted to the access times when there are a large number of users, such that at some intermediate point the ideal number of users can be determined as the point where access times exceed acceptable limitations.

While one preferred embodiment of the method for displaying and analyzing performance data for simulated client-users has been described, there can be other-type embodiments which also fall within the scope of the invention as defined in the attached claims.

APPENDIX I

| Column 1 User ID | Column 2 Application Program | Column 3 Milliseconds to Access Program | Column 4 Test Cycle Sequence Time |
|---|---|---|---|
| user001 | Connect | 13216 | 0:00:13 |
| user001 | Excel | 1073 | 0:00:16 |
| user002 | Connect | 10460 | 0:01:08 |
| user002 | Excel | 536 | 0:01:11 |
| user001 | Outlook | 2148 | 0:01:25 |
| user003 | Connect | 10736 | 0:02:07 |
| user003 | Excel | 619 | 0:02:09 |
| user002 | Outlook | 864 | 0:02:17 |
| user004 | Connect | 11175 | 0:03:05 |
| user004 | Excel | 654 | 0:03:08 |
| user003 | Outlook | 918 | 0:03:16 |
| user005 | Connect | 10903 | 0:04:03 |
| user005 | Excel | 617 | 0:04:06 |
| user004 | Outlook | 1096 | 0:04:14 |
| user006 | Connect | 10051 | 0:05:00 |
| user006 | Excel | 579 | 0:05:03 |
| user005 | Outlook | 1038 | 0:05:12 |
| user001 | Command Prompt | 30283 | 0:05:40 |
| user001 | IExplorer | 1105 | 0:05:44 |
| user007 | Connect | 10817 | 0:05:59 |
| user007 | Excel | 561 | 0:06:01 |
| user006 | Outlook | 1083 | 0:06:09 |
| user002 | Command Prompt | 26762 | 0:06:28 |
| user002 | IExplorer | 664 | 0:06:31 |
| user008 | Connect | 10718 | 0:06:57 |
| user008 | Excel | 575 | 0:06:59 |
| user007 | Outlook | 822 | 0:07:07 |
| user003 | Command Prompt | 26783 | 0:07:26 |
| user003 | IExplorer | 717 | 0:07:30 |
| user009 | Connect | 10028 | 0:07:54 |
| user009 | Excel | 635 | 0:07:57 |
| user008 | Outlook | 1154 | 0:08:06 |
| user004 | Command Prompt | 26985 | 0:08:25 |
| user004 | IExplorer | 738 | 0:08:29 |
| user010 | Connect | 10526 | 0:08:53 |
| user010 | Excel | 585 | 0:08:55 |
| user009 | Outlook | 941 | 0:09:03 |

APPENDIX I-continued

| Column 1 User ID | Column 2 Application Program | Column 3 Milliseconds to Access Program | Column 4 Test Cycle Sequence Time |
|---|---|---|---|
| user001 | Word | 1019 | 0:09:22 |
| user005 | Command Prompt | 26814 | 0:09:23 |
| user005 | IExplorer | 771 | 0:09:26 |
| user011 | Connect | 10204 | 0:09:50 |
| user011 | Excel | 631 | 0:09:53 |
| user010 | Outlook | 1276 | 0:10:02 |
| user002 | Word | 334 | 0:10:08 |
| user006 | Command Prompt | 26833 | 0:10:20 |
| user006 | IExplorer | 786 | 0:10:24 |
| user012 | Connect | 10641 | 0:10:49 |
| user012 | Excel | 425 | 0:10:51 |
| user011 | Outlook | 1096 | 0:10:59 |
| user003 | Word | 547 | 0:11:07 |
| user007 | Command Prompt | 26699 | 0:11:18 |
| user007 | IExplorer | 707 | 0:11:22 |
| user013 | Connect | 10978 | 0:11:47 |
| user013 | Excel | 537 | 0:11:50 |
| user012 | Outlook | 911 | 0:11:57 |
| user004 | Word | 582 | 0:12:06 |
| user008 | Command Prompt | 26963 | 0:12:17 |
| user008 | IExplorer | 801 | 0:12:21 |
| user014 | Connect | 9968 | 0:12:44 |
| user014 | Excel | 551 | 0:12:46 |
| user013 | Outlook | 929 | 0:12:56 |
| user005 | Word | 523 | 0:13:03 |
| user009 | Command Prompt | 26814 | 0:13:14 |
| user009 | IExplorer | 750 | 0:13:17 |
| user015 | Connect | 10104 | 0:13:42 |
| user015 | Excel | 581 | 0:13:45 |
| user014 | Outlook | 933 | 0:13:53 |
| user006 | Word | 608 | 0:14:01 |
| user010 | Command Prompt | 27024 | 0:14:13 |
| user010 | IExplorer | 750 | 0:14:17 |
| user016 | Connect | 10271 | 0:14:40 |
| user016 | Excel | 567 | 0:14:43 |
| user015 | Outlook | 872 | 0:14:51 |
| user007 | Word | 439 | 0:14:58 |
| user011 | Command Prompt | 26904 | 0:15:10 |
| user011 | IExplorer | 800 | 0:15:14 |
| user017 | Connect | 10872 | 0:15:39 |
| user017 | Excel | 645 | 0:15:42 |
| user016 | Outlook | 936 | 0:15:49 |
| user008 | Word | 535 | 0:15:57 |
| user012 | Command Prompt | 26819 | 0:16:08 |
| user012 | IExplorer | 655 | 0:16:12 |
| user018 | Connect | 10730 | 0:16:37 |
| user018 | Excel | 600 | 0:16:39 |
| user017 | Outlook | 1010 | 0:16:48 |
| user009 | Word | 472 | 0:16:54 |
| user013 | Command Prompt | 26919 | 0:17:07 |
| user013 | IExplorer | 613 | 0:17:10 |
| user019 | Connect | 10353 | 0:17:34 |
| user019 | Excel | 716 | 0:17:37 |
| user018 | Outlook | 1072 | 0:17:46 |
| user010 | Word | 557 | 0:17:53 |
| user014 | Command Prompt | 26799 | 0:18:04 |
| user014 | IExplorer | 731 | 0:18:07 |
| user020 | Connect | 10392 | 0:18:32 |
| user020 | Excel | 578 | 0:18:35 |
| user019 | Outlook | 1002 | 0:18:44 |
| user011 | Word | 719 | 0:18:51 |
| user015 | Command Prompt | 26839 | 0:19:02 |
| user015 | IExplorer | 818 | 0:19:06 |
| user021 | Connect | 9978 | 0:19:30 |
| user021 | Excel | 616 | 0:19:33 |
| user020 | Outlook | 1164 | 0:19:42 |
| user012 | Word | 569 | 0:19:48 |
| user016 | Command Prompt | 26919 | 0:20:00 |
| user016 | IExplorer | 713 | 0:20:04 |
| user022 | Connect | 11150 | 0:20:29 |
| user022 | Excel | 509 | 0:20:32 |
| user021 | Outlook | 973 | 0:20:39 |
| user013 | Word | 598 | 0:20:47 |
| user017 | Command Prompt | 26913 | 0:20:59 |

APPENDIX I-continued

| Column 1 User ID | Column 2 Application Program | Column 3 Milliseconds to Access Program | Column 4 Test Cycle Sequence Time |
|---|---|---|---|
| user017 | IExplorer | 764 | 0:21:03 |
| user023 | Connect | 10753 | 0:21:27 |
| user023 | Excel | 636 | 0:21:29 |
| user022 | Outlook | 1199 | 0:21:38 |
| user014 | Word | 474 | 0:21:44 |
| user018 | Command Prompt | 26913 | 0:21:57 |
| user018 | IExplorer | 827 | 0:22:01 |
| user024 | Connect | 9984 | 0:22:24 |
| user024 | Excel | 561 | 0:22:27 |
| user023 | Outlook | 1184 | 0:22:36 |
| user015 | Word | 473 | 0:22:42 |
| user019 | Command Prompt | 26954 | 0:22:55 |
| user019 | IExplorer | 799 | 0:22:58 |
| user025 | Connect | 10023 | 0:23:22 |
| user025 | Excel | 608 | 0:23:25 |
| user024 | Outlook | 978 | 0:23:33 |
| user016 | Word | 513 | 0:23:40 |
| user020 | Command Prompt | 27013 | 0:23:53 |
| user020 | IExplorer | 823 | 0:23:57 |
| user026 | Connect | 11208 | 0:24:21 |
| user026 | Excel | 628 | 0:24:24 |
| user025 | Outlook | 970 | 0:24:31 |
| user017 | Word | 436 | 0:24:39 |
| user021 | Command Prompt | 26923 | 0:24:50 |
| user021 | IExplorer | 785 | 0:24:54 |
| user027 | Connect | 10699 | 0:25:19 |
| user027 | Excel | 873 | 0:25:22 |
| user026 | Outlook | 1030 | 0:25:30 |
| user018 | Word | 555 | 0:25:38 |
| user022 | Command Prompt | 26955 | 0:25:49 |
| user022 | IExplorer | 733 | 0:25:53 |
| user028 | Connect | 10190 | 0:26:16 |
| user028 | Excel | 645 | 0:26:19 |
| user027 | Outlook | 1074 | 0:26:28 |
| user019 | Word | 532 | 0:26:35 |
| user023 | Command Prompt | 26783 | 0:26:47 |
| user023 | IExplorer | 845 | 0:26:51 |
| user029 | Connect | 10082 | 0:27:14 |
| user029 | Excel | 611 | 0:27:17 |
| user028 | Outlook | 1136 | 0:27:26 |
| user020 | Word | 527 | 0:27:33 |
| user024 | Command Prompt | 26949 | 0:27:44 |
| user024 | IExplorer | 651 | 0:27:47 |
| user030 | Connect | 10062 | 0:28:12 |
| user030 | Excel | 570 | 0:28:15 |
| user029 | Outlook | 1115 | 0:28:23 |
| user021 | Word | 521 | 0:28:31 |
| user025 | Command Prompt | 27034 | 0:28:42 |
| user025 | IExplorer | 796 | 0:28:46 |
| user031 | Connect | 11142 | 0:29:11 |
| user031 | Excel | 662 | 0:29:14 |
| user030 | Outlook | 1050 | 0:29:21 |
| user022 | Word | 687 | 0:29:30 |
| user026 | Command Prompt | 27053 | 0:29:41 |
| user026 | IExplorer | 780 | 0:29:45 |
| user032 | Connect | 10686 | 0:30:09 |
| user032 | Excel | 543 | 0:30:11 |
| user031 | Outlook | 1139 | 0:30:21 |
| user023 | Word | 544 | 0:30:27 |
| user027 | Command Prompt | 26952 | 0:30:39 |
| user027 | IExplorer | 790 | 0:30:43 |
| user033 | Connect | 10152 | 0:31:06 |
| user033 | Excel | 633 | 0:31:09 |
| user032 | Outlook | 1036 | 0:31:18 |
| user024 | Word | 573 | 0:31:24 |
| user028 | Command Prompt | 27084 | 0:31:37 |
| user028 | IExplorer | 806 | 0:31:40 |
| user034 | Connect | 10260 | 0:32:04 |
| user034 | Excel | 655 | 0:32:07 |
| user033 | Outlook | 921 | 0:32:15 |
| user025 | Word | 644 | 0:32:23 |
| user029 | Command Prompt | 27014 | 0:32:34 |
| user029 | IExplorer | 831 | 0:32:38 |
| user035 | Connect | 10129 | 0:33:02 |
| user035 | Excel | 590 | 0:33:05 |
| user034 | Outlook | 1064 | 0:33:14 |
| user026 | Word | 667 | 0:33:22 |
| user030 | Command Prompt | 26729 | 0:33:32 |
| user030 | IExplorer | 712 | 0:33:36 |
| user036 | Connect | 10752 | 0:34:01 |
| user036 | Excel | 670 | 0:34:03 |
| user035 | Outlook | 945 | 0:34:11 |
| user027 | Word | 621 | 0:34:20 |
| user031 | Command Prompt | 27064 | 0:34:32 |
| user031 | IExplorer | 750 | 0:34:35 |
| user037 | Connect | 10835 | 0:34:59 |
| user037 | Excel | 681 | 0:35:02 |
| user036 | Outlook | 1007 | 0:35:10 |
| user028 | Word | 538 | 0:35:17 |
| user032 | Command Prompt | 26949 | 0:35:29 |
| user032 | IExplorer | 777 | 0:35:33 |
| user038 | Connect | 10127 | 0:35:56 |
| user038 | Excel | 738 | 0:35:59 |
| user037 | Outlook | 1174 | 0:36:08 |
| user029 | Word | 624 | 0:36:15 |
| user033 | Command Prompt | 26949 | 0:36:26 |
| user033 | IExplorer | 628 | 0:36:30 |
| user039 | Connect | 10403 | 0:36:54 |
| user039 | Excel | 682 | 0:36:57 |
| user038 | Outlook | 1160 | 0:37:06 |
| user030 | Word | 588 | 0:37:12 |
| user034 | Command Prompt | 26865 | 0:37:24 |
| user034 | IExplorer | 867 | 0:37:28 |
| user040 | Connect | 10524 | 0:37:53 |
| user040 | Excel | 631 | 0:37:55 |
| user039 | Outlook | 1127 | 0:38:04 |
| user031 | Word | 607 | 0:38:12 |
| user035 | Command Prompt | 27019 | 0:38:22 |
| user035 | IExplorer | 733 | 0:38:26 |
| user041 | Connect | 11445 | 0:38:51 |
| user041 | Excel | 827 | 0:38:54 |
| user040 | Outlook | 1062 | 0:39:02 |
| user032 | Word | 605 | 0:39:09 |
| user036 | Command Prompt | 27143 | 0:39:21 |
| user036 | IExplorer | 815 | 0:39:25 |
| user042 | Connect | 10940 | 0:39:49 |
| user042 | Excel | 978 | 0:39:52 |
| user041 | Outlook | 1182 | 0:40:01 |
| user033 | Word | 664 | 0:40:06 |
| user037 | Command Prompt | 27093 | 0:40:19 |
| user037 | IExplorer | 818 | 0:40:23 |
| user043 | Connect | 10229 | 0:40:46 |
| user043 | Excel | 657 | 0:40:49 |
| user042 | Outlook | 986 | 0:40:59 |
| user034 | Word | 537 | 0:41:05 |
| user038 | Command Prompt | 27083 | 0:41:17 |
| user038 | IExplorer | 869 | 0:41:21 |
| user044 | Connect | 10588 | 0:41:45 |
| user044 | Excel | 751 | 0:41:47 |
| user043 | Outlook | 956 | 0:41:55 |
| user035 | Word | 610 | 0:42:02 |
| user039 | Command Prompt | 27044 | 0:42:15 |
| user039 | IExplorer | 777 | 0:42:18 |
| user045 | Connect | 10892 | 0:42:43 |
| user045 | Excel | 665 | 0:42:46 |
| user044 | Outlook | 1124 | 0:42:54 |
| user036 | Word | 554 | 0:43:02 |
| user040 | Command Prompt | 27022 | 0:43:13 |
| user040 | IExplorer | 792 | 0:43:16 |
| user046 | Connect | 10867 | 0:43:41 |
| user046 | Excel | 692 | 0:43:44 |
| user045 | Outlook | 1153 | 0:43:52 |
| user037 | Word | 555 | 0:44:00 |
| user041 | Command Prompt | 27054 | 0:44:12 |
| user041 | IExplorer | 797 | 0:44:16 |
| user047 | Connect | 10205 | 0:44:38 |
| user047 | Excel | 705 | 0:44:41 |
| user046 | Outlook | 1089 | 0:44:50 |

APPENDIX I-continued

| Column 1 User ID | Column 2 Application Program | Column 3 Milliseconds to Access Program | Column 4 Test Cycle Sequence Time |
|---|---|---|---|
| user038 | Word | 568 | 0:44:57 |
| user042 | Command Prompt | 26974 | 0:45:09 |
| user042 | IExplorer | 842 | 0:45:13 |
| user048 | Connect | 10886 | 0:45:37 |
| user048 | Excel | 644 | 0:45:40 |
| user047 | Outlook | 1111 | 0:45:48 |
| user039 | Word | 658 | 0:45:55 |
| user043 | Command Prompt | 27124 | 0:46:06 |
| user043 | IExplorer | 837 | 0:46:10 |
| user049 | Connect | 10589 | 0:46:35 |
| user049 | Excel | 810 | 0:46:37 |
| user048 | Outlook | 873 | 0:46:46 |
| user040 | Word | 620 | 0:46:53 |
| user044 | Command Prompt | 27034 | 0:47:05 |
| user044 | IExplorer | 779 | 0:47:09 |
| user050 | Connect | 10832 | 0:47:33 |
| user050 | Excel | 854 | 0:47:36 |
| user049 | Outlook | 993 | 0:47:44 |
| user041 | Word | 662 | 0:47:53 |
| user045 | Command Prompt | 27074 | 0:48:03 |
| user045 | IExplorer | 916 | 0:48:07 |
| user051 | Connect | 11212 | 0:48:31 |
| user051 | Excel | 716 | 0:48:34 |
| user050 | Outlook | 1178 | 0:48:42 |
| user042 | Word | 609 | 0:48:50 |
| user046 | Command Prompt | 27053 | 0:49:01 |
| user046 | IExplorer | 832 | 0:49:05 |
| user052 | Connect | 10591 | 0:49:29 |
| user052 | Excel | 712 | 0:49:31 |
| user051 | Outlook | 1153 | 0:49:41 |
| user043 | Word | 548 | 0:49:47 |
| user047 | Command Prompt | 27064 | 0:49:59 |
| user047 | IExplorer | 893 | 0:50:02 |
| user053 | Connect | 10687 | 0:50:28 |
| user053 | Excel | 790 | 0:50:31 |
| user052 | Outlook | 1302 | 0:50:39 |
| user044 | Word | 714 | 0:50:46 |
| user048 | Command Prompt | 27039 | 0:50:57 |
| user048 | IExplorer | 736 | 0:51:01 |
| user054 | Connect | 10271 | 0:51:25 |
| user054 | Excel | 631 | 0:51:28 |
| user053 | Outlook | 1332 | 0:51:38 |
| user045 | Word | 682 | 0:51:44 |
| user049 | Command Prompt | 26989 | 0:51:55 |
| user049 | IExplorer | 792 | 0:51:59 |
| user055 | Connect | 11033 | 0:52:24 |
| user055 | Excel | 643 | 0:52:27 |
| user054 | Outlook | 982 | 0:52:34 |
| user046 | Word | 704 | 0:52:42 |
| user050 | Command Prompt | 27185 | 0:52:54 |
| user050 | IExplorer | 890 | 0:52:57 |
| user056 | Connect | 11329 | 0:53:22 |
| user056 | Excel | 680 | 0:53:25 |
| user055 | Outlook | 902 | 0:53:33 |
| user047 | Word | 704 | 0:53:39 |
| user051 | Command Prompt | 27133 | 0:53:52 |
| user051 | IExplorer | 853 | 0:53:56 |
| user057 | Connect | 10199 | 0:54:19 |
| user057 | Excel | 1196 | 0:54:22 |
| user056 | Outlook | 1062 | 0:54:32 |
| user048 | Word | 753 | 0:54:37 |
| user052 | Command Prompt | 27223 | 0:54:50 |
| user052 | IExplorer | 865 | 0:54:54 |
| user058 | Connect | 10294 | 0:55:17 |
| user058 | Excel | 722 | 0:55:20 |
| user057 | Outlook | 1074 | 0:55:29 |
| user049 | Word | 657 | 0:55:35 |
| user053 | Command Prompt | 27064 | 0:55:48 |
| user053 | IExplorer | 926 | 0:55:52 |
| user059 | Connect | 10293 | 0:56:15 |
| user059 | Excel | 816 | 0:56:18 |
| user058 | Outlook | 1204 | 0:56:27 |
| user050 | Word | 724 | 0:56:34 |
| user054 | Command Prompt | 27030 | 0:56:45 |
| user054 | IExplorer | 774 | 0:56:49 |
| user060 | Connect | 11295 | 0:57:14 |
| user060 | Excel | 846 | 0:57:17 |
| user059 | Outlook | 1063 | 0:57:25 |
| user051 | Word | 695 | 0:57:33 |
| user055 | Command Prompt | 26989 | 0:57:44 |
| user055 | IExplorer | 874 | 0:57:48 |
| user061 | Connect | 13145 | 0:58:14 |
| user061 | Excel | 903 | 0:58:17 |
| user060 | Outlook | 1062 | 0:58:24 |
| user052 | Word | 782 | 0:58:31 |
| user056 | Command Prompt | 27200 | 0:58:43 |
| user056 | IExplorer | 826 | 0:58:47 |
| user062 | Connect | 10440 | 0:59:09 |
| user062 | Excel | 801 | 0:59:12 |
| user061 | Outlook | 1333 | 0:59:24 |
| user053 | Word | 690 | 0:59:29 |
| user057 | Command Prompt | 26999 | 0:59:40 |
| user057 | IExplorer | 821 | 0:59:44 |
| user063 | Connect | 11855 | 1:00:09 |
| user063 | Excel | 866 | 1:00:12 |
| user062 | Outlook | 1081 | 1:00:19 |
| user054 | Word | 643 | 1:00:26 |
| user058 | Command Prompt | 27213 | 1:00:38 |
| user058 | IExplorer | 827 | 1:00:42 |
| user064 | Connect | 10840 | 1:01:06 |
| user064 | Excel | 1229 | 1:01:09 |
| user063 | Outlook | 1267 | 1:01:19 |
| user055 | Word | 632 | 1:01:24 |
| user059 | Command Prompt | 27160 | 1:01:36 |
| user059 | IExplorer | 911 | 1:01:40 |
| user065 | Connect | 11372 | 1:02:04 |
| user065 | Excel | 1331 | 1:02:08 |
| user064 | Outlook | 1061 | 1:02:16 |
| user056 | Word | 776 | 1:02:23 |
| user060 | Command Prompt | 27120 | 1:02:35 |
| user060 | IExplorer | 831 | 1:02:39 |
| user066 | Connect | 11333 | 1:03:02 |
| user066 | Excel | 837 | 1:03:05 |
| user065 | Outlook | 1206 | 1:03:15 |
| user057 | Word | 666 | 1:03:20 |
| user061 | Command Prompt | 27045 | 1:03:35 |
| user061 | IExplorer | 880 | 1:03:39 |
| user067 | Connect | 10818 | 1:04:00 |
| user067 | Excel | 916 | 1:04:03 |
| user066 | Outlook | 1093 | 1:04:12 |
| user058 | Word | 731 | 1:04:19 |
| user062 | Command Prompt | 27125 | 1:04:30 |
| user062 | IExplorer | 860 | 1:04:34 |
| user068 | Connect | 10682 | 1:04:58 |
| user068 | Excel | 900 | 1:05:01 |
| user067 | Outlook | 1204 | 1:05:10 |
| user059 | Word | 654 | 1:05:16 |
| user063 | Command Prompt | 27098 | 1:05:30 |
| user063 | IExplorer | 935 | 1:05:34 |
| user069 | Connect | 10861 | 1:05:56 |
| user069 | Excel | 724 | 1:05:59 |
| user068 | Outlook | 1265 | 1:06:07 |
| user060 | Word | 646 | 1:06:15 |
| user064 | Command Prompt | 27009 | 1:06:27 |
| user064 | IExplorer | 752 | 1:06:30 |
| user070 | Connect | 11638 | 1:06:55 |
| user070 | Excel | 932 | 1:06:58 |
| user069 | Outlook | 1091 | 1:07:05 |
| user061 | Word | 700 | 1:07:16 |
| user065 | Command Prompt | 27094 | 1:07:26 |
| user065 | IExplorer | 856 | 1:07:30 |
| user071 | Connect | 11817 | 1:07:54 |
| user071 | Excel | 1068 | 1:07:57 |
| user070 | Outlook | 1115 | 1:08:04 |
| user062 | Word | 600 | 1:08:11 |
| user066 | Command Prompt | 27345 | 1:08:23 |
| user066 | IExplorer | 1692 | 1:08:28 |
| user072 | Connect | 11111 | 1:08:51 |

APPENDIX I-continued

| Column 1 User ID | Column 2 Application Program | Column 3 Milliseconds to Access Program | Column 4 Test Cycle Sequence Time |
|---|---|---|---|
| user072 | Excel | 1384 | 1:08:55 |
| user071 | Outlook | 1061 | 1:09:04 |
| user063 | Word | 778 | 1:09:12 |
| user067 | Command Prompt | 27260 | 1:09:21 |
| user067 | IExplorer | 832 | 1:09:25 |
| user073 | Connect | 10798 | 1:09:49 |
| user073 | Excel | 1897 | 1:09:53 |
| user072 | Outlook | 1062 | 1:10:01 |
| user064 | Word | 656 | 1:10:07 |
| user068 | Command Prompt | 27350 | 1:10:19 |
| user068 | IExplorer | 973 | 1:10:23 |
| user074 | Connect | 10633 | 1:10:47 |
| user074 | Excel | 1350 | 1:10:50 |
| user073 | Outlook | 1141 | 1:11:00 |
| user065 | Word | 822 | 1:11:07 |
| user069 | Command Prompt | 27120 | 1:11:16 |
| user069 | IExplorer | 804 | 1:11:20 |
| user075 | Connect | 11055 | 1:11:45 |
| user075 | Excel | 974 | 1:11:48 |
| user074 | Outlook | 1138 | 1:11:57 |
| user066 | Word | 605 | 1:12:05 |
| user070 | Command Prompt | 27213 | 1:12:16 |
| user070 | IExplorer | 917 | 1:12:20 |
| user076 | Connect | 11604 | 1:12:44 |
| user076 | Excel | 890 | 1:12:46 |
| user075 | Outlook | 1164 | 1:12:55 |
| user067 | Word | 679 | 1:13:01 |
| user071 | Command Prompt | 26949 | 1:13:14 |
| user071 | IExplorer | 758 | 1:13:18 |
| user077 | Connect | 11590 | 1:13:42 |
| user077 | Excel | 1114 | 1:13:45 |
| user076 | Outlook | 1215 | 1:13:53 |
| user068 | Word | 653 | 1:13:59 |
| user072 | Command Prompt | 27009 | 1:14:12 |
| user072 | IExplorer | 803 | 1:14:16 |
| user078 | Connect | 11325 | 1:14:39 |
| user078 | Excel | 827 | 1:14:42 |
| user077 | Outlook | 1276 | 1:14:52 |
| user069 | Word | 658 | 1:14:57 |
| user073 | Command Prompt | 27080 | 1:15:11 |
| user073 | IExplorer | 816 | 1:15:14 |
| user079 | Connect | 10025 | 1:15:36 |
| user079 | Excel | 1512 | 1:15:40 |
| user078 | Outlook | 1087 | 1:15:49 |
| user070 | Word | 735 | 1:15:57 |
| user074 | Command Prompt | 27150 | 1:16:08 |
| user074 | IExplorer | 820 | 1:16:12 |
| user080 | Connect | 10828 | 1:16:35 |
| user080 | Excel | 1644 | 1:16:39 |
| user079 | Outlook | 1052 | 1:16:46 |
| user071 | Word | 793 | 1:16:55 |
| user075 | Command Prompt | 27170 | 1:17:06 |
| user075 | IExplorer | 949 | 1:17:10 |
| user081 | Connect | 12191 | 1:17:34 |
| user081 | Excel | 1621 | 1:17:38 |
| user080 | Outlook | 1091 | 1:17:45 |
| user072 | Word | 984 | 1:17:53 |
| user076 | Command Prompt | 27240 | 1:18:04 |
| user076 | IExplorer | 994 | 1:18:08 |
| user082 | Connect | 12390 | 1:18:32 |
| user082 | Excel | 1080 | 1:18:36 |
| user081 | Outlook | 1187 | 1:18:45 |
| user073 | Word | 770 | 1:18:51 |
| user077 | Command Prompt | 27150 | 1:19:03 |
| user077 | IExplorer | 961 | 1:19:07 |
| user083 | Connect | 10012 | 1:19:28 |
| user083 | Excel | 1044 | 1:19:31 |
| user082 | Outlook | 1234 | 1:19:43 |
| user074 | Word | 687 | 1:19:48 |
| user078 | Command Prompt | 27030 | 1:20:00 |
| user078 | IExplorer | 1026 | 1:20:04 |
| user084 | Connect | 11523 | 1:20:28 |
| user084 | Excel | 996 | 1:20:31 |
| user083 | Outlook | 1366 | 1:20:38 |
| user075 | Word | 682 | 1:20:47 |
| user079 | Command Prompt | 27200 | 1:20:57 |
| user079 | IExplorer | 852 | 1:21:01 |
| user085 | Connect | 11441 | 1:21:27 |
| user085 | Excel | 1116 | 1:21:30 |
| user084 | Outlook | 1288 | 1:21:37 |
| user076 | Word | 707 | 1:21:45 |
| user080 | Command Prompt | 27259 | 1:21:57 |
| user080 | IExplorer | 831 | 1:22:00 |
| user086 | Connect | 11978 | 1:22:25 |
| user086 | Excel | 1473 | 1:22:29 |
| user085 | Outlook | 1280 | 1:22:37 |
| user077 | Word | 731 | 1:22:43 |
| user081 | Command Prompt | 27341 | 1:22:56 |
| user081 | IExplorer | 889 | 1:23:00 |
| user087 | Connect | 11040 | 1:23:22 |
| user087 | Excel | 1551 | 1:23:26 |
| user086 | Outlook | 1106 | 1:23:35 |
| user078 | Word | 771 | 1:23:41 |
| user082 | Command Prompt | 27406 | 1:23:54 |
| user082 | IExplorer | 946 | 1:23:58 |
| user088 | Connect | 11006 | 1:24:20 |
| user088 | Excel | 1881 | 1:24:24 |
| user087 | Outlook | 1124 | 1:24:32 |
| user079 | Word | 928 | 1:24:39 |
| user083 | Command Prompt | 27493 | 1:24:50 |
| user083 | IExplorer | 1101 | 1:24:54 |
| user089 | Connect | 10856 | 1:25:18 |
| user089 | Excel | 1206 | 1:25:21 |
| user088 | Outlook | 1078 | 1:25:31 |
| user080 | Word | 756 | 1:25:37 |
| user084 | Command Prompt | 27210 | 1:25:49 |
| user084 | IExplorer | 911 | 1:25:52 |
| user090 | Connect | 10901 | 1:26:16 |
| user090 | Excel | 1326 | 1:26:19 |
| user089 | Outlook | 1303 | 1:26:28 |
| user081 | Word | 867 | 1:26:37 |
| user085 | Command Prompt | 27140 | 1:26:48 |
| user085 | IExplorer | 1158 | 1:26:52 |
| user091 | Connect | 11085 | 1:27:14 |
| user091 | Excel | 1215 | 1:27:17 |
| user090 | Outlook | 1531 | 1:27:27 |
| user082 | Word | 749 | 1:27:35 |
| user086 | Command Prompt | 27070 | 1:27:46 |
| user086 | IExplorer | 851 | 1:27:50 |
| user092 | Connect | 11607 | 1:28:13 |
| user092 | Excel | 1401 | 1:28:16 |
| user091 | Outlook | 1521 | 1:28:25 |
| user083 | Word | 803 | 1:28:31 |
| user087 | Command Prompt | 27220 | 1:28:43 |
| user087 | IExplorer | 899 | 1:28:47 |
| user093 | Connect | 10653 | 1:29:10 |
| user093 | Excel | 1665 | 1:29:13 |
| user092 | Outlook | 1450 | 1:29:23 |
| user084 | Word | 752 | 1:29:30 |
| user088 | Command Prompt | 27300 | 1:29:42 |
| user088 | IExplorer | 852 | 1:29:46 |
| user094 | Connect | 13259 | 1:30:10 |
| user094 | Excel | 1917 | 1:30:14 |
| user093 | Outlook | 1138 | 1:30:20 |
| user085 | Word | 677 | 1:30:29 |
| user089 | Command Prompt | 27716 | 1:30:40 |
| user089 | IExplorer | 1005 | 1:30:44 |
| user095 | Connect | 10139 | 1:31:05 |
| user095 | Excel | 3291 | 1:31:10 |
| user094 | Outlook | 1393 | 1:31:21 |
| user086 | Word | 822 | 1:31:27 |
| user090 | Command Prompt | 27640 | 1:31:38 |
| user090 | IExplorer | 1006 | 1:31:42 |
| user096 | Connect | 11668 | 1:32:05 |
| user096 | Excel | 2491 | 1:32:09 |
| user095 | Outlook | 1308 | 1:32:18 |
| user087 | Word | 867 | 1:32:25 |
| user091 | Command Prompt | 27444 | 1:32:36 |

APPENDIX I-continued

| Column 1 User ID | Column 2 Application Program | Column 3 Milliseconds to Access Program | Column 4 Test Cycle Sequence Time |
|---|---|---|---|
| user091 | IExplorer | 1137 | 1:32:40 |
| user097 | Connect | 11276 | 1:33:02 |
| user097 | Excel | 1950 | 1:33:06 |
| user096 | Outlook | 1120 | 1:33:16 |
| user088 | Word | 824 | 1:33:23 |
| user092 | Command Prompt | 27260 | 1:33:34 |
| user092 | IExplorer | 881 | 1:33:38 |
| user098 | Connect | 10653 | 1:34:00 |
| user098 | Excel | 848 | 1:34:03 |
| user097 | Outlook | 1184 | 1:34:13 |
| user089 | Word | 1001 | 1:34:21 |
| user093 | Command Prompt | 27050 | 1:34:31 |
| user093 | IExplorer | 973 | 1:34:35 |
| user099 | Connect | 11854 | 1:34:59 |
| user099 | Excel | 1353 | 1:35:02 |
| user098 | Outlook | 1560 | 1:35:10 |
| user090 | Word | 696 | 1:35:19 |
| user094 | Command Prompt | 27059 | 1:35:32 |
| user094 | IExplorer | 1090 | 1:35:36 |
| user100 | Connect | 12115 | 1:35:57 |
| user100 | Excel | 1509 | 1:36:01 |
| user099 | Outlook | 1687 | 1:36:10 |
| user091 | Word | 806 | 1:36:17 |
| user095 | Command Prompt | 27226 | 1:36:29 |
| user095 | IExplorer | 924 | 1:36:33 |
| user101 | Connect | 11930 | 1:36:55 |
| user101 | Excel | 1570 | 1:36:59 |
| user100 | Outlook | 1845 | 1:37:08 |
| user092 | Word | 742 | 1:37:15 |
| user096 | Command Prompt | 27470 | 1:37:27 |
| user096 | IExplorer | 971 | 1:37:31 |
| user102 | Connect | 12419 | 1:37:53 |
| user102 | Excel | 2026 | 1:37:57 |
| user101 | Outlook | 1163 | 1:38:05 |
| user093 | Word | 1062 | 1:38:12 |
| user097 | Command Prompt | 27640 | 1:38:25 |
| user097 | IExplorer | 1032 | 1:38:29 |
| user103 | Connect | 11292 | 1:38:50 |
| user103 | Excel | 2491 | 1:38:55 |
| user102 | Outlook | 1179 | 1:39:04 |
| user094 | Word | 853 | 1:39:13 |
| user098 | Command Prompt | 27420 | 1:39:21 |
| user098 | IExplorer | 1119 | 1:39:25 |
| user104 | Connect | 11305 | 1:39:48 |
| user104 | Excel | 1873 | 1:39:52 |
| user103 | Outlook | 1511 | 1:40:02 |
| user095 | Word | 946 | 1:40:10 |
| user099 | Command Prompt | 27486 | 1:40:21 |
| user099 | IExplorer | 1303 | 1:40:26 |
| user105 | Connect | 11719 | 1:40:47 |
| user105 | Excel | 1433 | 1:40:50 |
| user104 | Outlook | 1432 | 1:40:59 |
| user096 | Word | 837 | 1:41:08 |
| user100 | Command Prompt | 27285 | 1:41:20 |
| user100 | IExplorer | 1062 | 1:41:24 |
| user106 | Connect | 12120 | 1:41:45 |
| user106 | Excel | 1057 | 1:41:48 |
| user105 | Outlook | 1542 | 1:41:58 |
| user097 | Word | 921 | 1:42:07 |
| user101 | Command Prompt | 27230 | 1:42:17 |
| user101 | IExplorer | 889 | 1:42:20 |
| user107 | Connect | 11707 | 1:42:43 |
| user107 | Excel | 1383 | 1:42:46 |
| user106 | Outlook | 1465 | 1:42:55 |
| user098 | Word | 720 | 1:43:02 |
| user102 | Command Prompt | 27140 | 1:43:15 |
| user102 | IExplorer | 859 | 1:43:19 |
| user108 | Connect | 11991 | 1:43:42 |
| user108 | Excel | 1571 | 1:43:46 |
| user107 | Outlook | 1647 | 1:43:54 |
| user099 | Word | 801 | 1:44:03 |
| user103 | Command Prompt | 27250 | 1:44:13 |
| user103 | IExplorer | 870 | 1:44:17 |
| user109 | Connect | 11533 | 1:44:40 |
| user109 | Excel | 2807 | 1:44:44 |
| user108 | Outlook | 1817 | 1:44:53 |
| user100 | Word | 859 | 1:45:01 |
| user104 | Command Prompt | 27771 | 1:45:11 |
| user104 | IExplorer | 914 | 1:45:15 |
| user110 | Connect | 12304 | 1:45:38 |
| user110 | Excel | 3280 | 1:45:44 |
| user109 | Outlook | 1043 | 1:45:51 |
| user101 | Word | 850 | 1:45:57 |
| user105 | Command Prompt | 27801 | 1:46:10 |
| user105 | IExplorer | 1230 | 1:46:14 |
| user111 | Connect | 11036 | 1:46:35 |
| user111 | Excel | 3882 | 1:46:41 |
| user102 | Word | 958 | 1:46:57 |
| user106 | Command Prompt | 27961 | 1:47:07 |
| user106 | IExplorer | 1088 | 1:47:11 |
| user112 | Connect | 11158 | 1:47:33 |
| user112 | Excel | 2639 | 1:47:38 |
| user111 | Outlook | 1152 | 1:47:48 |
| user103 | Word | 887 | 1:47:54 |
| user107 | Command Prompt | 27640 | 1:48:05 |
| user107 | IExplorer | 1035 | 1:48:09 |
| user113 | Connect | 12778 | 1:48:33 |
| user113 | Excel | 1590 | 1:48:36 |
| user112 | Outlook | 1499 | 1:48:45 |
| user104 | Word | 985 | 1:48:52 |
| user108 | Command Prompt | 28251 | 1:49:05 |
| user108 | IExplorer | 1018 | 1:49:09 |
| user114 | Connect | 12726 | 1:49:31 |
| user114 | Excel | 1591 | 1:49:34 |
| user113 | Outlook | 1535 | 1:49:44 |
| user105 | Word | 843 | 1:49:51 |
| user109 | Command Prompt | 27300 | 1:50:02 |
| user109 | IExplorer | 1098 | 1:50:06 |
| user115 | Connect | 12445 | 1:50:28 |
| user115 | Excel | 3051 | 1:50:34 |
| user114 | Outlook | 1535 | 1:50:42 |
| user106 | Word | 822 | 1:50:48 |
| user110 | Outlook | 1402 | 1:51:18 |
| user116 | Connect | 11630 | 1:51:26 |
| user116 | Excel | 2868 | 1:51:31 |
| user115 | Outlook | 1212 | 1:51:41 |
| user107 | Word | 881 | 1:51:46 |
| user111 | Command Prompt | 27861 | 1:52:00 |
| user111 | IExplorer | 946 | 1:52:03 |
| user117 | Connect | 13699 | 1:52:26 |
| user117 | Excel | 3384 | 1:52:31 |
| user116 | Outlook | 1868 | 1:52:38 |
| user108 | Word | 752 | 1:52:46 |
| user112 | Command Prompt | 27961 | 1:52:57 |
| user112 | IExplorer | 1293 | 1:53:01 |
| user118 | Connect | 14140 | 1:53:24 |
| user118 | Excel | 2867 | 1:53:29 |
| user117 | Outlook | 1971 | 1:53:39 |
| user109 | Word | 917 | 1:53:43 |
| user113 | Command Prompt | 27911 | 1:53:56 |
| user113 | IExplorer | 1259 | 1:54:00 |
| user119 | Connect | 11492 | 1:54:20 |
| user119 | Excel | 4187 | 1:54:26 |
| user118 | Outlook | 1730 | 1:54:37 |
| user114 | Command Prompt | 28021 | 1:54:54 |
| user114 | IExplorer | 1062 | 1:54:58 |
| user120 | Connect | 13734 | 1:55:20 |
| user120 | Excel | 2231 | 1:55:24 |
| user110 | Command Prompt | 27725 | 1:55:30 |
| user119 | Outlook | 1964 | 1:55:34 |
| user110 | IExplorer | 1593 | 1:55:35 |
| user111 | Word | 1111 | 1:55:41 |
| user115 | Command Prompt | 28301 | 1:55:53 |
| user115 | IExplorer | 1000 | 1:55:57 |
| user121 | Connect | 14001 | 1:56:13 |
| user121 | Excel | 4984 | 1:56:20 |
| user120 | Outlook | 1527 | 1:56:32 |
| user112 | Word | 985 | 1:56:39 |

APPENDIX I-continued

| Column 1 User ID | Column 2 Application Program | Column 3 Milliseconds to Access Program | Column 4 Test Cycle Sequence Time |
|---|---|---|---|
| user116 | Command Prompt | 27801 | 1:56:51 |
| user116 | IExplorer | 1363 | 1:56:55 |
| user122 | Connect | 14586 | 1:57:12 |
| user122 | Excel | 5084 | 1:57:19 |
| user121 | Outlook | 1773 | 1:57:28 |
| user113 | Word | 846 | 1:57:37 |
| user117 | Command Prompt | 27390 | 1:57:51 |
| user117 | IExplorer | 1399 | 1:57:56 |
| user123 | Connect | 14328 | 1:58:09 |
| user123 | Excel | 5542 | 1:58:17 |
| user122 | Outlook | 3945 | 1:58:29 |
| user114 | Word | 1343 | 1:58:35 |
| user118 | Command Prompt | 27801 | 1:58:50 |
| user118 | IExplorer | 1341 | 1:58:55 |
| user124 | Connect | 13284 | 1:59:06 |
| user124 | Excel | 6906 | 1:59:15 |
| user110 | Word | 8415 | 1:59:19 |
| user123 | Outlook | 2721 | 1:59:26 |
| user115 | Word | 1225 | 1:59:36 |
| user119 | Command Prompt | 27906 | 1:59:51 |
| user119 | IExplorer | 1295 | 1:59:56 |
| user125 | Connect | 12675 | 2:00:04 |
| user125 | Excel | 5422 | 2:00:11 |
| user124 | Outlook | 2053 | 2:00:25 |
| user116 | Word | 1542 | 2:00:34 |
| user120 | Command Prompt | 28257 | 2:00:49 |
| user120 | IExplorer | 1949 | 2:00:54 |
| user126 | Connect | 15246 | 2:01:04 |
| user126 | Excel | 8251 | 2:01:15 |
| user125 | Outlook | 2325 | 2:01:22 |
| user117 | Word | 1014 | 2:01:33 |
| user121 | Command Prompt | 27969 | 2:01:45 |
| user121 | IExplorer | 1362 | 2:01:49 |
| user127 | Connect | 13381 | 2:02:00 |
| user127 | Excel | 6620 | 2:02:09 |
| user126 | Outlook | 2002 | 2:02:23 |
| user118 | Word | 1188 | 2:02:32 |
| user122 | Command Prompt | 27573 | 2:02:45 |
| user122 | IExplorer | 1592 | 2:02:50 |
| user128 | Connect | 14757 | 2:03:00 |
| user128 | Excel | 6969 | 2:03:09 |
| user127 | Outlook | 4703 | 2:03:22 |
| user119 | Word | 1767 | 2:03:34 |
| user123 | Command Prompt | 27978 | 2:03:43 |
| user123 | IExplorer | 1562 | 2:03:47 |
| user129 | Connect | 14234 | 2:03:57 |
| user129 | Excel | 7516 | 2:04:07 |
| user128 | Outlook | 2692 | 2:04:19 |
| user120 | Word | 1142 | 2:04:32 |
| user124 | Command Prompt | 28057 | 2:04:42 |
| user124 | IExplorer | 1419 | 2:04:46 |
| user130 | Connect | 14263 | 2:04:55 |
| user130 | Excel | 9806 | 2:05:07 |
| user129 | Outlook | 6603 | 2:05:21 |
| user121 | Word | 1414 | 2:05:27 |
| user125 | Command Prompt | 29058 | 2:05:42 |
| user125 | IExplorer | 1892 | 2:05:47 |
| user131 | Connect | 13036 | 2:05:52 |
| user131 | Excel | 4724 | 2:05:59 |
| user130 | Outlook | 1847 | 2:06:18 |
| user122 | Word | 1321 | 2:06:28 |
| user126 | Command Prompt | 27656 | 2:06:40 |
| user126 | IExplorer | 1362 | 2:06:45 |
| user132 | Connect | 13610 | 2:06:51 |
| user132 | Excel | 6941 | 2:07:00 |
| user131 | Outlook | 9401 | 2:07:17 |
| user123 | Word | 1298 | 2:07:26 |
| user127 | Command Prompt | 29393 | 2:07:38 |
| user127 | IExplorer | 1862 | 2:07:43 |
| user133 | Connect | 14150 | 2:07:49 |
| user133 | Excel | 3308 | 2:07:55 |
| user132 | Outlook | 3230 | 2:08:12 |
| user124 | Word | 1434 | 2:08:25 |
| user128 | Command Prompt | 28838 | 2:08:34 |
| user128 | IExplorer | 1904 | 2:08:39 |
| user134 | Connect | 14661 | 2:08:48 |
| user134 | Excel | 7554 | 2:08:57 |
| user133 | Outlook | 8252 | 2:09:11 |
| user125 | Word | 1203 | 2:09:25 |
| user129 | Command Prompt | 28087 | 2:09:39 |
| user129 | IExplorer | 2365 | 2:09:44 |
| user135 | Connect | 18179 | 2:09:49 |
| user135 | Excel | 9693 | 2:10:01 |
| user134 | Outlook | 5935 | 2:10:13 |
| user126 | Word | 1175 | 2:10:24 |
| user130 | Command Prompt | 28748 | 2:10:37 |
| user130 | IExplorer | 2114 | 2:10:42 |
| user136 | Connect | 14311 | 2:10:43 |
| user136 | Excel | 6839 | 2:10:52 |
| user135 | Outlook | 2572 | 2:11:11 |
| user127 | Word | 1149 | 2:11:22 |
| user131 | Command Prompt | 28777 | 2:11:36 |
| user131 | IExplorer | 5424 | 2:11:44 |
| user137 | Connect | 20028 | 2:11:47 |
| user137 | Excel | 10651 | 2:12:00 |
| user136 | Outlook | 12980 | 2:12:16 |
| user128 | Word | 5124 | 2:12:21 |
| user132 | Command Prompt | 30054 | 2:12:34 |
| user132 | IExplorer | 2363 | 2:12:39 |
| user138 | Connect | 19305 | 2:12:44 |
| user138 | Excel | 8968 | 2:12:55 |
| user137 | Outlook | 3262 | 2:13:17 |
| user129 | Word | 3005 | 2:13:25 |
| user133 | Command Prompt | 30284 | 2:13:31 |
| user133 | IExplorer | 1836 | 2:13:36 |
| user139 | Connect | 22289 | 2:13:45 |
| user139 | Excel | 12348 | 2:14:00 |
| user138 | Outlook | 6771 | 2:14:15 |
| user130 | Word | 2224 | 2:14:22 |
| user134 | Command Prompt | 29323 | 2:14:33 |
| user140 | Connect | 18354 | 2:14:39 |
| user134 | IExplorer | 16044 | 2:14:52 |
| user140 | Excel | 18614 | 2:15:00 |
| user139 | Outlook | 11516 | 2:15:23 |
| user131 | Word | 6548 | 2:15:29 |
| user135 | Command Prompt | 30204 | 2:15:36 |
| user141 | Connect | 29569 | 2:15:49 |
| user135 | IExplorer | 26094 | 2:16:05 |
| user141 | Excel | 30733 | 2:16:21 |
| user140 | Outlook | 18352 | 2:16:32 |
| user132 | Word | 15651 | 2:16:33 |
| user136 | Command Prompt | 30284 | 2:16:46 |
| user136 | IExplorer | 18599 | 2:17:08 |
| user142 | Connect | 51017 | 2:17:08 |
| user142 | Excel | 22383 | 2:17:33 |
| user133 | Word | 19721 | 2:17:35 |
| user137 | Command Prompt | 31522 | 2:17:41 |
| user141 | Outlook | 20010 | 2:17:57 |
| user137 | IExplorer | 29390 | 2:18:14 |
| user143 | Connect | 68988 | 2:18:24 |
| user134 | Word | 15732 | 2:18:49 |
| user138 | Command Prompt | 31873 | 2:18:51 |
| user143 | Excel | 38236 | 2:19:04 |
| user138 | IExplorer | 36797 | 2:19:30 |
| user142 | Outlook | 27224 | 2:19:30 |
| user144 | Connect | 78082 | 2:19:31 |
| user139 | Command Prompt | 31011 | 2:20:03 |
| user135 | Word | 26196 | 2:20:14 |
| user144 | Excel | 43589 | 2:20:17 |
| user145 | Connect | 89341 | 2:20:40 |
| user139 | IExplorer | 37063 | 2:20:43 |
| user140 | Command Prompt | 31312 | 2:21:14 |
| user136 | Word | 28941 | 2:21:17 |
| user145 | Excel | 44058 | 2:21:27 |
| user143 | Outlook | 36607 | 2:21:43 |
| user146 | Connect | 100499 | 2:21:51 |
| user140 | IExplorer | 42470 | 2:22:00 |
| user137 | Word | 32030 | 2:22:28 |

APPENDIX I-continued

| Column 1<br>User ID | Column 2<br>Application<br>Program | Column 3<br>Milliseconds<br>to Access<br>Program | Column 4<br>Test Cycle<br>Sequence Time |
|---|---|---|---|
| user146 | Excel | 62611 | 2:22:55 |
| user147 | Connect | 109510 | 2:22:58 |
| user141 | Command Prompt | 35768 | 2:23:00 |
| user144 | Outlook | 43427 | 2:23:21 |
| user138 | Word | 34164 | 2:23:45 |
| user141 | IExplorer | 44759 | 2:23:48 |
| user148 | Connect | 113198 | 2:23:59 |
| user147 | Excel | 78019 | 2:24:18 |
| user142 | Command Prompt | 37378 | 2:24:44 |
| user145 | Outlook | 41387 | 2:24:48 |
| user149 | Connect | 107967 | 2:24:53 |
| user139 | Word | 31799 | 2:24:55 |
| user148 | Excel | 54818 | 2:24:56 |
| user142 | IExplorer | 50264 | 2:25:37 |
| user150 | Connect | 113729 | 2:25:57 |
| user149 | Excel | 81703 | 2:26:17 |
| user140 | Word | 37795 | 2:26:18 |
| user146 | Outlook | 48120 | 2:26:35 |
| user151 | Connect | 117341 | 2:26:58 |
| user143 | Command Prompt | 33554 | 2:27:09 |
| user150 | Excel | 78786 | 2:27:18 |
| user152 | Connect | 111451 | 2:27:51 |
| user143 | IExplorer | 47685 | 2:27:59 |
| user147 | Outlook | 42858 | 2:28:00 |
| user141 | Word | 33640 | 2:28:02 |
| user151 | Excel | 79254 | 2:28:20 |
| user148 | Outlook | 48626 | 2:28:47 |
| user144 | Command Prompt | 35251 | 2:28:55 |
| user153 | Connect | 123617 | 2:29:01 |
| user152 | Excel | 80091 | 2:29:13 |
| user144 | IExplorer | 46320 | 2:29:45 |
| user154 | Connect | 118091 | 2:29:53 |
| user142 | Word | 38882 | 2:29:57 |
| user149 | Outlook | 51033 | 2:30:10 |
| user153 | Excel | 81869 | 2:30:25 |
| user145 | Command Prompt | 38431 | 2:30:27 |
| user155 | Connect | 118959 | 2:30:52 |
| user154 | Excel | 71163 | 2:31:06 |
| user145 | IExplorer | 48498 | 2:31:19 |
| user150 | Outlook | 52157 | 2:31:23 |
| user156 | Connect | 124052 | 2:31:55 |
| user146 | Command Prompt | 34996 | 2:32:08 |
| user155 | Excel | 82861 | 2:32:17 |
| user143 | Word | 42916 | 2:32:23 |
| user151 | Outlook | 55481 | 2:32:43 |
| user157 | Connect | 124123 | 2:32:53 |
| user146 | IExplorer | 50636 | 2:33:02 |
| user156 | Excel | 97168 | 2:33:34 |
| user147 | Command Prompt | 38461 | 2:33:41 |
| user158 | Connect | 129876 | 2:33:57 |
| user144 | Word | 42450 | 2:34:07 |
| user157 | Excel | 79400 | 2:34:15 |
| user148 | Command Prompt | 38501 | 2:34:29 |
| user147 | IExplorer | 51067 | 2:34:35 |
| user159 | Connect | 120779 | 2:34:46 |
| user158 | Excel | 77347 | 2:35:16 |
| user148 | IExplorer | 49062 | 2:35:21 |
| user145 | Word | 29693 | 2:35:32 |
| user160 | Connect | 117272 | 2:35:40 |
| user149 | Command Prompt | 35577 | 2:35:45 |
| user152 | Outlook | 44787 | 2:36:05 |
| user159 | Excel | 83394 | 2:36:11 |
| user161 | Connect | 110717 | 2:36:32 |
| user155 | Outlook | 46606 | 2:36:34 |
| user149 | IExplorer | 46685 | 2:36:35 |
| user150 | Command Prompt | 34710 | 2:36:54 |
| user160 | Excel | 79498 | 2:37:02 |
| user146 | Word | 36699 | 2:37:20 |
| user162 | Connect | 111596 | 2:37:31 |
| user150 | IExplorer | 41571 | 2:37:38 |
| user161 | Excel | 73460 | 2:37:47 |

APPENDIX II

DATA FILES user001, Connect, 13216, 2000/08/29 02:24:01
user001, Excel, 1073, 2000/08/29 02:24:04
user001, Outlook, 2148, 2000/08/29 02:25:13
user001, Command Prompt, 30283, 2000/08/29 02:29:28
user001, IExplorer, 1105, 2000/08/29 02:29:32
user001, Word, 1019, 2000/08/29 02:33:10
user002, Connect, 10460, 2000/08/29 02:24:56
user002, Excel, 0536, 2000/08/29 02:24:59
user002, Outlook, 0864, 2000/08/29 02:26:05
user002, Command Prompt, 26762, 2000/08/29 02:30:16
user002, IExplorer, 0664, 2000/08/29 02:30:19
user002, Word, 0334, 2000/08/29 02:33:56

What is claimed is:

1. A method for graphically analyzing and displaying the test performance parameters of multiple concurrent client-users comprising the steps of:

(a) accessing a Terminal Server data file to get test performance data parameters accumulated during a test run cycle which provided various application programs to each of a multiple number of concurrent client-users;

(b) formatting said test performance data into logical files such as client-user ID, Name of Application Program to be accessed, time period required to access program, and time-moment sequence value of each test completed;

(c) sorting said test performance data into performance categories for said logical files;

(d) plotting and graphing said performance data onto a Windows screen.

2. In a PC bank holding multiple personal computers serving multiple client users, said PC bank connected to a test server means for establishing performance criteria of said server farm and said client users, a method of accumulating performance parameters for each client and organizing them for observable display to enable analysis of the host Terminal Server under variable operating conditions, comprising the steps of:

(a) Loading a Terminal Server data file with operating data providing operational parameters during simulated client operations;

(b) utilizing an Excel program to initiate a sequence of operations for organizing the data in said timer log file;

(c) querying each set of accumulated Terminal Server data files in a sequential series of actions;

(d) sorting said Terminal Server data files into selected categories for subsequent display;

(e) calculating the values of each parameter involved for each Terminal Server data file.

3. The method of claim 2 which includes the step of:

(f) Graphically portraying said parameters for ease of analysis of the operating conditions to indicate those which are acceptable and those which are not acceptable.

4. A method for graphical analysis display of the accumulated results from a performance measuring tool comprising the steps of:

(a) Simulating operations of different application programs for each of a multiple number of client users;

(b) sequencing a cycle of operations so that the number of concurrent client users operates from a small number of client users to a large number of client users;

(c) logging parametric data in a timer log file for each occurrence of designated actions during said sequencing of the test cycle;

(d) sorting said parametric data into performance categories;

(e) displaying said parametric data for analysis by an operator.

5. A system for organizing and displaying the results from performance testing of a terminal server, wherein each server services multiple clients, comprising:

(a) Terminal Server means for servicing multiple clients (10a–10n);

(b) means for connecting said server farm means (10) to Back-end End Servers means (14) to a Monitor Control Servers means (16) and to a test-server Server means (18);

(c) said Back-end Servers means (14) for providing a simulated real world environment to said server farm means (10) and its multiple clients (10a–10n);

(d) said Monitor-Control Server means (16) for distributing and executing scripts and for accumulating timer log files of performance parameters for each individual client (10x);

(e) program organizing means for collecting, sorting, and formatting said parametric data in said timer log files for separation into various parametric categories enabling the display of the working parameters of said terminal server during operating conditions which vary from a small number of client users to a large number of client users.

6. A system which interconnects multiple numbers of client-users for accumulating parametric performance data on each Client-user wherein said system provides graphical outputs indicating the values of the various parameters of the accumulated parametric data for view by an analyst, said system comprising:

(a) means for accumulating parametric operational data for a sequence of different programs to be accessed and opened by each one of said multiple number of Client-users wherein said parametrical operation data includes:

(a1) logon time required for each Client-User to access each particular Application Program out of a group of available Application Programs;

(a2) the time-moment value of the test result occurring for each Client-user correlated with each Application program;

(b) means for developing said parametric operational data during a test cycle which ranges from a small number of concurrent Client-users to a very large number of concurrent Client-users;

(c) means for developing said parametric operational data in an individual test cycle where only one Client-user is involved;

(d) means for graphically displaying a graph indicating the milliseconds required for an individual Client-user to access a particular Application Program where there are various different number of multiple concurrent users;

(e) means for accessing, sorting, and organizing said parametric data into selected categories for providing an output display which enables an analyst to evaluate the operational efficiency of said terminal server under different operating conditions in terms of various numbers of concurrent users at each given moment of time;

(f) means to differentiate performance characteristics between multiple users operating on a single PC terminal thus providing the ability to make a full and more accurate analysis of the clients' actions independent of otherwise indistinguishable factors such as network performance, geographic location, and PC performance.

7. The system of claim 6 which includes:

(g) means for graphically displaying a graph indicating the milliseconds required for an individual client-user to access a particular Application Program when there are multiple concurrent users.

8. In a PC farm holding multiple Personal Computers servicing multiple simulated Client-PC's in a Terminal Server providing Terminal Server Script programs, allowing multiple simultaneous sessions, said PC farm connected to a test server means for establishing performance characteristics of said simulated clients, a method of graphically displaying each script program, the period from log-on time to response, and the time period from initiating to opening an application, comprising the steps of:

(a) supplying test scripts, via a control server means, to each one of said multiple Clients;

(b) providing a simulated Client program to each one of said multiple Clients;

(c) providing, via a test server means, Client space in memory for each one of said Clients;

(d) initiating said Terminal Server Client script for connection to a selected Client and a Timer program means which logs the start time of application program initiation and the stop time when the application is available;

(e) accessing a Terminal Server data file to get test performance data parameters accumulated during a test run cycle which provided various application programs to each of a multiple number of concurrent Client-users;

(f) formatting said test performance data into logical files such as Client-user ID, Name of Application Program to be accessed, time period required to access program, and time-moment sequence value of each test completed;

(g) sorting said test performance data into performance categories for said logical files;

(h) plotting and graphing said performance data onto a Windows screen.

9. A system for performance testing of a Terminal Server means with multiple servers which enables graphical display of test performance parameters of multiple Client-users, comprising:

(a) Terminal Server means (10) for servicing multiple Client-users (10a–10n);

(b) means for connecting said Server Farm means to a Back-End Server means (14), to a Monitor-Control server means (16), and to a Test-Server means (18);

(c) said Back-End Servers means (14) for providing a simulated real world environment to said Farm (10);

(d) said Monitor-Control Server means (16) for distributing and executing scripts and for collecting Timer Log files for performance parameters for each individual Client-User;

(e) said Test Server (18) means for sensing mouse operations and keyboard strokes for each of said Client-Users;

(f) means for accumulating parametric operational data for a sequence of different programs to be accessed and opened by each one of said multiple number of Client-users;

(g) means for accessing, sorting, and organizing said parametric data into selected categories for providing an output display which enables an analyst to evaluate the operational efficiency of said terminal server under different operating conditions in terms of various numbers of concurrent users at each given moment in time.

* * * * *